United States Patent [19]
Kim et al.

[11] Patent Number: 5,664,218
[45] Date of Patent: Sep. 2, 1997

[54] INTEGRATED MULTIMEDIA INPUT/OUTPUT PROCESSOR

[75] Inventors: Hyun-Ki Kim; Ok-Keun Shin; Ha-Jae Chung; Jin Lee, all of Daejeon, Rep. of Korea

[73] Assignee: Electronics and Telecommunications Research Institute, Daejeon, Rep. of Korea

[21] Appl. No.: 353,262

[22] Filed: Dec. 5, 1994

[30] Foreign Application Priority Data

Dec. 24, 1993 [KR] Rep. of Korea ............... 93-29631

[51] Int. Cl.6 ............... H04N 7/15; G06F 17/00; G06F 3/14
[52] U.S. Cl. ............... 395/821; 395/807; 395/523; 395/888; 348/15; 364/715.02
[58] Field of Search ............... 395/821, 280, 395/650, 154, 147, 131, 162, 501, 520, 328, 882, 615, 807; 348/14, 15; 364/188, 514, 514 A; 345/150, 115, 204, 133; 379/90

[56] References Cited

U.S. PATENT DOCUMENTS

| | | | |
|---|---|---|---|
| 5,245,322 | 9/1993 | Dinwiddie, Jr. et al. | 345/115 |
| 5,283,638 | 2/1994 | Engberg et al. | 348/14 |
| 5,325,423 | 6/1994 | Lewis | 379/90 |
| 5,335,321 | 8/1994 | Harney et al. | 395/162 |
| 5,392,407 | 2/1995 | Heil et al. | 395/293 |
| 5,428,730 | 6/1995 | Baker et al. | 395/154 |
| 5,434,592 | 7/1995 | Dinwiddie, Jr. et al. | 345/133 |
| 5,464,946 | 11/1995 | Lewis | 84/609 |
| 5,469,192 | 11/1995 | Allen et al. | 345/157 |
| 5,471,576 | 11/1995 | Yee | 395/154 |
| 5,475,421 | 12/1995 | Palmer et al. | 348/15 |
| 5,491,498 | 2/1996 | Koyama et al. | 345/190 |
| 5,541,640 | 7/1996 | Larson | 348/19 |
| 5,553,220 | 9/1996 | Keene | 395/520 |
| 5,557,724 | 9/1996 | Sampat et al. | 395/327 |
| 5,564,001 | 10/1996 | Lewis | 395/806 |
| 5,594,660 | 1/1997 | Sung et al. | 364/514 R |

*Primary Examiner*—Gopal C. Ray
*Attorney, Agent, or Firm*—Larson and Taylor

[57] ABSTRACT

The present invention relates to an integrated multimedia board for a high speed local bus, and has an object to simultaneously process multimedia data at high speed in one integrated board by using a PCI local bus. To achieve the object, the present invention consists of an audio unit which processes an audio signal, a video unit which processes a video signal, a graphics unit which processes text and graphics data, and a host interface unit for interfacing with a PCI bus which is a high speed local bus. Also, the present invention can process information of a text, a sound, a still image, a motion image, and a graphics data, etc, and is useable for video teleconferencing, and a video editing, etc.

14 Claims, 3 Drawing Sheets

INTEGRATED MULTIMEDIA INPUT/OUTPUT PROCESSOR

BACKGROUND OF THE INVENTION

The present invention relates to an integrated multimedia board circuit integrating audio, video, and graphics, and more particularly, to an integrated multimedia board circuit for a high speed local bus which can process the integrated multimedia data integrating the audio, the video, and the graphics, etc. interface with a host through a peripheral component interconnection(PCI) bus which is used for a high speed local bus.

A conventional multimedia board circuit independently processes multimedia data by independently consisting of a respective board for processing audio, video, and graphics, and is interfaced with a host through an industrial standard architecture bus (ISA) or an extended industry standard architecture (EISA) bus.

Also, ADPCM, A-law, or u-low is used as a compression/decompression algorithm of audio data, and provides a portion of function of still image and motion image of video data.

Accordingly, it can provide only a limited function by using several multimedia boards in an application field like a video teleconferencing.

SUMMARY OF THE INVENTION

Accordingly, it is an object of the present invention to provide an integrated multimedia board for a high speed local bus which can transmit and receive data at a high speed by interfacing with a host through a PCI bus, as well as processing audio, video, and graphics data with one integrated board.

To achieve the above objects, a integrated multimedia board for high speed local bus according to the present invention comprises a video unit inputting an analog video signal of a still image or a motion image and compressing/decompressing the analog video data in real time and outputting the compressed/decompressed result to a monitor, an audio unit recording and reproducing a sound, compressing/decompressing the audio data, and synthesizing a sound source, a graphics unit outputting the image and performing graphics processing, and a host interface unit transmitting and receiving multimedia data at high speed.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
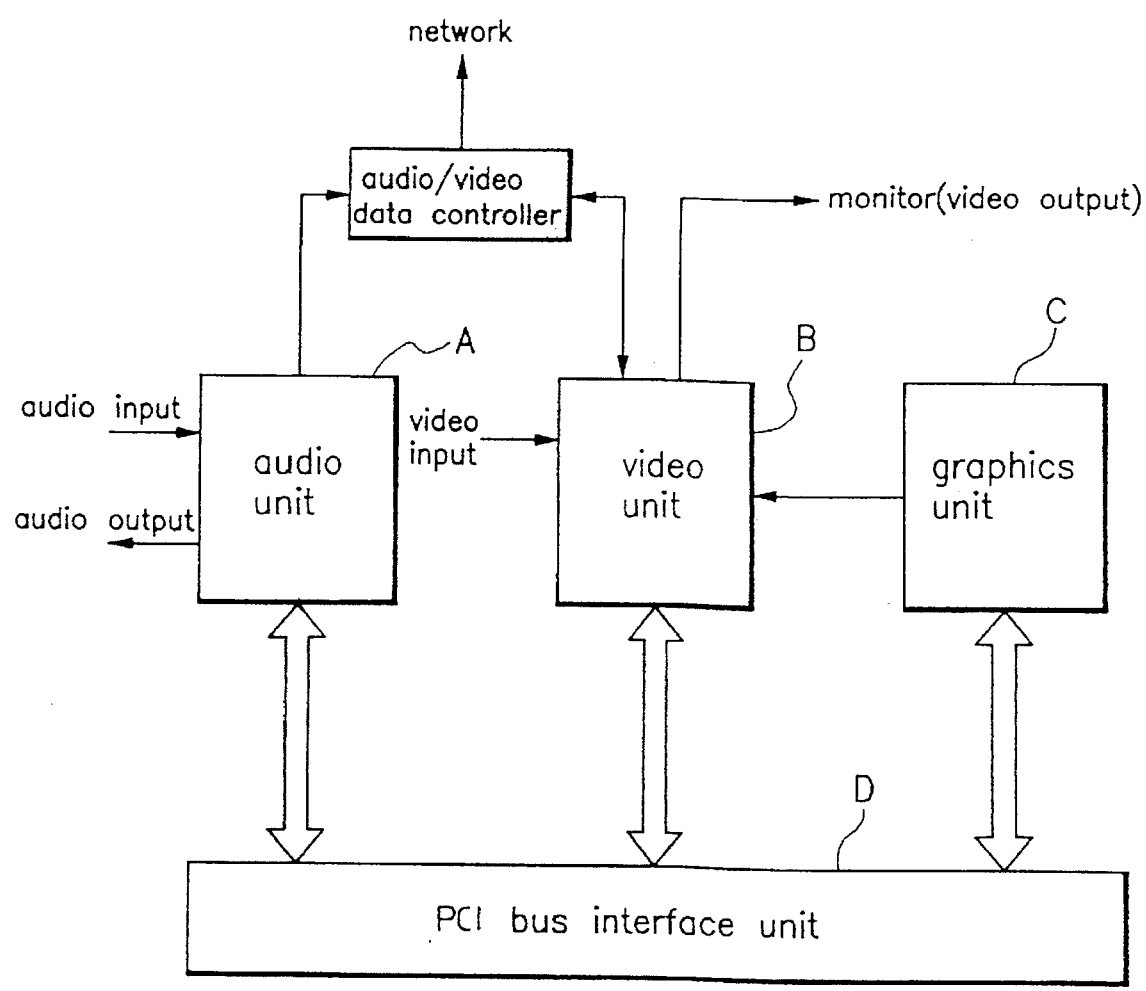
FIG. 1 is a block diagram of an integrated multimedia board circuit for a high speed local bus according to the present invention.
Figure 2:
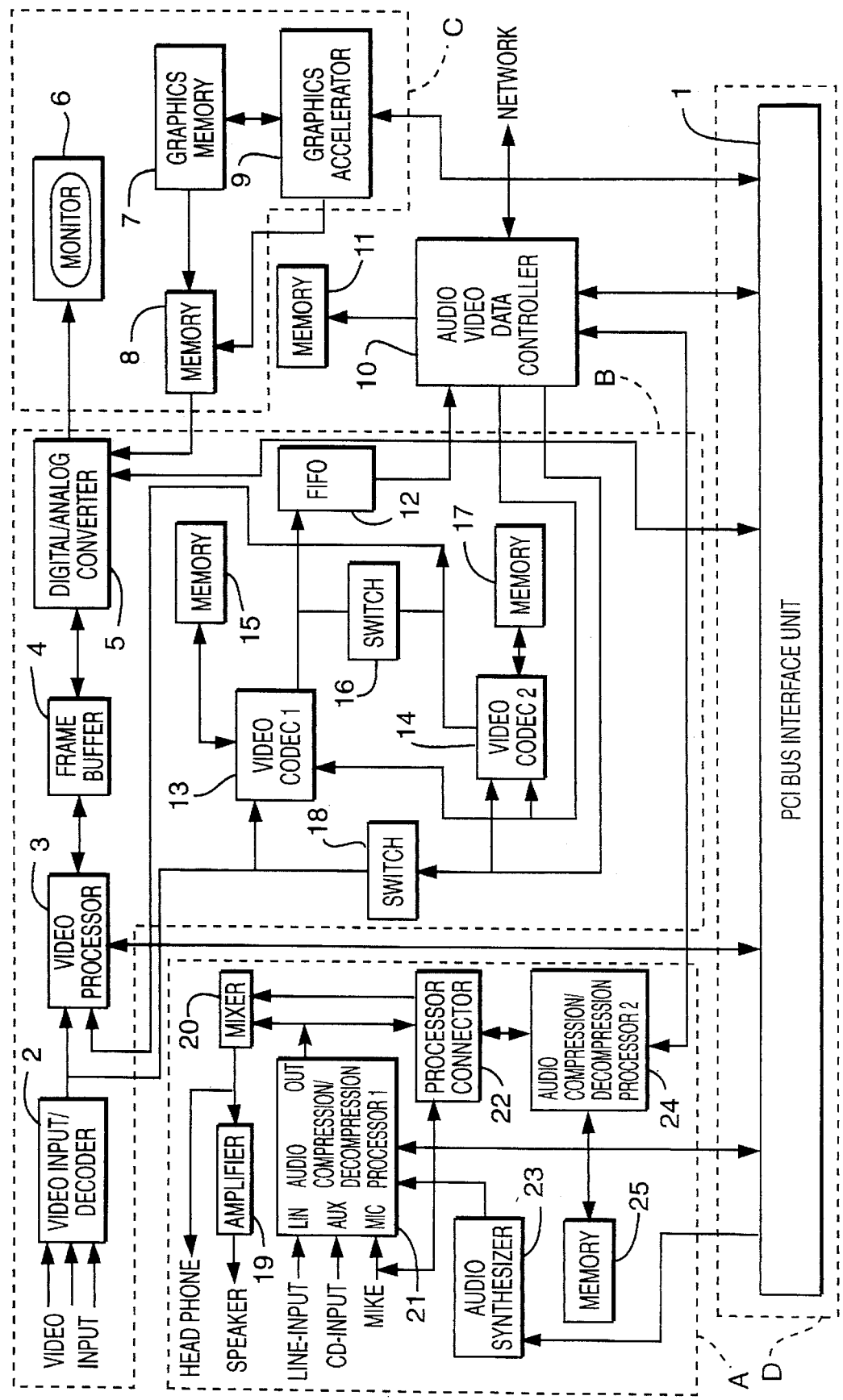
FIG. 2 is a detailed schematic circuit diagram of an integrated multimedia board circuit for a high speed local bus according to the present invention.

FIGS. 1 and 2 are a block diagram and a circuit diagram of an integrated multimedia board circuit for a high speed local bus according to the present invention.

Referring to FIG. 1, the present invention consists of an audio unit A taking charge of recording and reproducing a sound, and generating the sound by a sound source according to a media type, a video unit B inputting an analog video signal of a still image or a motion image and compressing/decompressing the analog video signal in real time, and outputting the compressed/decompressed result to a monitor, a graphics unit C processing text and graphics data and outputting the result to the monitor, and an host interface unit D interfaced with an host through a PCI bus.

The operation of the each unit will be described in detail below, referring to FIG. 2.

Firstly, the audio unit A has a function capable of recording and reproducing a sound, compressing/decompressing audio data, and synthesizing a sound source. The audio signal is inputted through a mike, an external stereo line, and a stereo compact disk input line. The input audio signal is converted to digital data by using an analog/digital converter installed within an audio compression/decompression processor 21. The digital data is compressed/decompressed by using an ADPCM algorithm, and the compressed/decompressed data is converted to analog data through the internal digital/analog converter. The converted analog data is outputted through a mixer 20 to a speaker and a headphone.

Audio compression/decompression processor1 21 converts analog data to digital data and vice versa, and has a function of mixing the analog signal and ADPCM compression/decompression.

An audio synthesizer 23 provides a sound source necessary for an audio synthesis in FM synthesis method.

Also, a processor connector 22 provides a serial port for communication of data between the audio compression/decompression processor1 and an audio compression/decompression processor2 24, and provides a compression/decompression algorithm of G.726ADPCM to which MPEG audio and CCITT propose.

The output of the audio compression/decompression processor1 21 and the output of the audio compression/decompression processor2 24 are directly outputted to the headphone through a mixer 20, or is outputted to the speaker through an amplifier 19.

Next, video unit B inputs an analog video signal of a still image or a motion image and compressing/decompressing the analog video signal in real time and outputs the compressed/decompressed result to a monitor 6.

A video input/decoder 2 selectively receives an analog video signal from a video source through three channels and amplifies the analog video signal which can be signals in the formats of NTSC, PAL, SECOM, etc. The video signal is inputted from a video source, and is converted from an analog video signal to a digital video data of a desired type. The digital video data of the desired type is selected and converted to a Y signal and a UV signal, and is controlled by I2C bus.

Video processor 3 can simultaneously process two video sources, has a function of a scaling, a digital video mixing, and a mixing of graphics and video, etc, and the processed data is stored to an external frame buffer 4.

The digital/analog converter 5 has a function of a mixing and management of a color space and two streams which have a different resolution, and a function of cursor, zoom, and a graphics overlay.

Video codec1 13 is used for encoding a video data in performing a H.261 algorithm for a video teleconferencing and video codec2 14 is used for decoding the video data. At this time, all switches are turned off.

The video codec1 13 transmits the encoded video data to an audio video data controller 10 through a FIFO register 12, outputted to a network by synchronizing with the audio data.

Also, in performing MPEG algorithm, two switches 16 and 18 are turned on, video codec1 13, and video codec2 14 respectively encode half of frame by dividing upper and lower.

The graphics unit C performs a function of an image output and a graphics process, and consists of a graphics accelerator 9 for the PCI bus, a video memory 7 for storing a graphics data, RAMDAC memory 8 for converting to an analog data when color palette which is used for transmitting the video data to a screen is connected to the monitor.

The host interface unit D uses the PCI bus which adopts a high speed local bus concept as an host bus, transmits and receives a multimedia data at high speed.

Figure 3:
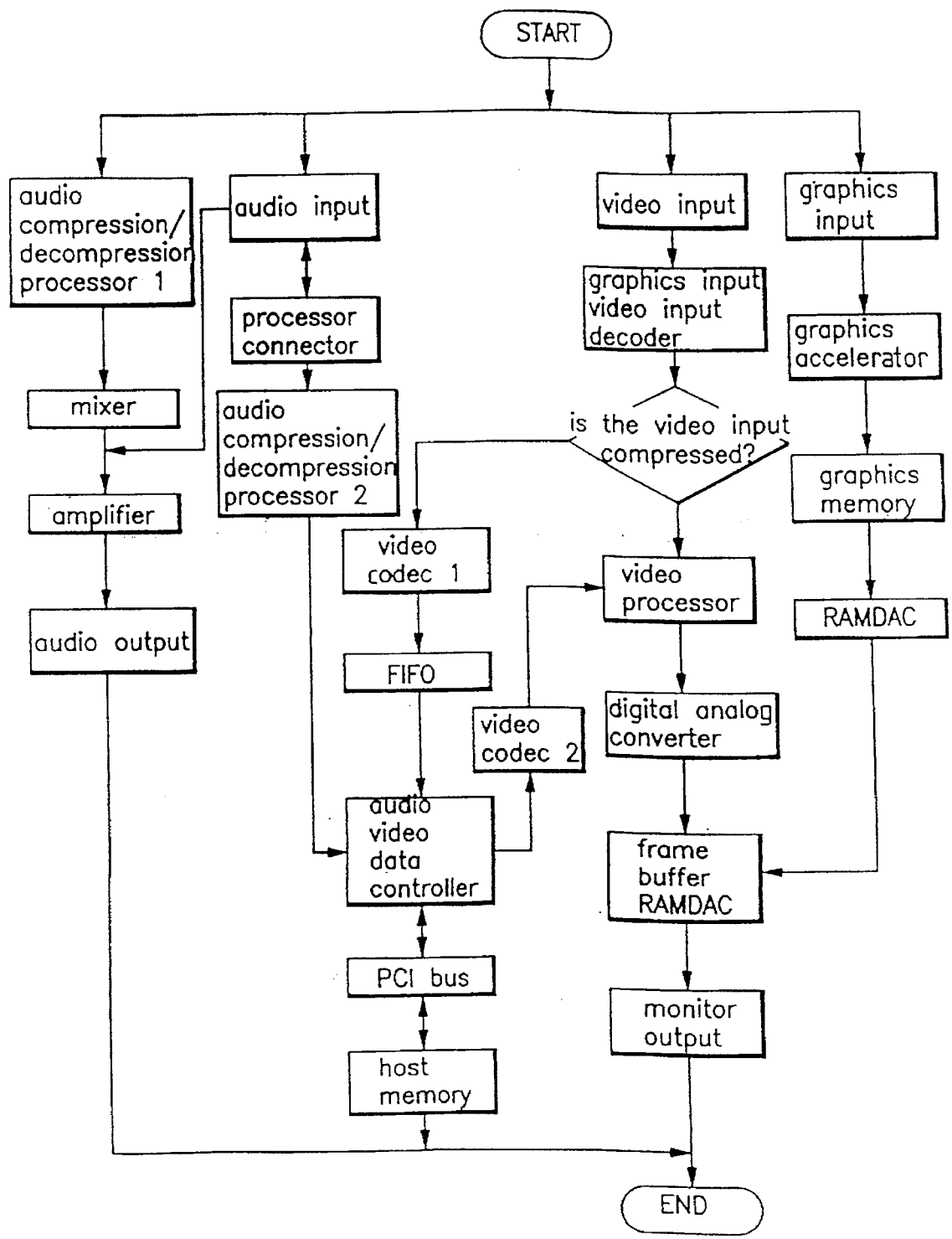
FIG. 3 is an operational flow chart for explaining an operation of the construction according to the present invention.

FIG. 3 is a flow chart for explaining an operation of the construction according to the present invention, the flow of each audio, video, graphics data will be described below.

The audio data is compressed in the audio compression/decompression processor1 21 and outputted to the speaker through the mixer 20 and the amplifier 19 in the case of performing ADPCM algorithm, and compressed in the audio compression/decompression processor2 24, is synthesized with the video data in the audio video data controller 10, and is stored in memory of the host system through the PCI bus in the case of performing MPEG or H.261 algorithm as sound quality of multimedia personal computer level.

A decoding process of the audio data is operated in a reverse order.

The video data is converted to a digital data in the video input/decoder 2, in the case of not compressing the digital data, stored the digital data in the frame buffer 4 through the video processor 3.

The stored video data is mixed up a graphics data in the digital/analog converter 5, and is outputted to the monitor 6. In the case of compressing the video data, after the video data is compressed in the video codec1 13, the compressed video data is stored in the host memory through the PCI bus by mixing the audio data in the audio video data controller through FIFO register 12.

In the decoding process of the video data, the data stored in host memory 11 is separated from the audio data in the audio video data controller 10 through the PCI bus, and decoded in video codec2 14, and outputted to monitor 6 through the video processor 3, the frame buffer 4, and the digital/analog converter 5.

Also, the graphics input data is stored in a graphics memory 7 through the graphics accelerator 9, and mixed up the video data in the digital/analog converter 5 through the RAMDAC 8, and the mixed data is outputted to the monitor 6.

As stated the above, the present invention can process information of text a still image, a motion or moving image, graphics data, etc, by simultaneously processing audio, video, and graphics data through the PCI bus at high speed, and can be applied for use to video teleconferencing, and video editing, etc.

What is claimed is:

1. An integrated multimedia board for a high speed local bus comprises:

a video unit which receives analog video data of a still image or a motion image and which includes means for compressing/decompressing said analog video data in real time and outputting the compressed/decompressed result to a monitor;

an audio unit which includes means for recording and reproducing audio data that represents a sound and for providing an audio output signal, compressing/decompressing the audio data, and synthesizing a sound source, wherein said audio unit comprises:

a first audio compression/decompression processor which converts analog data to digital data and vice versa, and which mixes said analog data with a compression/decompression algorithm;

a second audio compression/decompression processor which provides a compression/decompression algorithm of the audio digital data;

a processor connector which provides a serial port for communication of data of said first audio compression/decompression processor;

an audio synthesizer synthesizing the sound source;

a mixer and an amplifier for mixing and amplifying the audio output signal; and an audio video data controller for controlling and managing the audio and video data;

a graphics unit for outputting the image and performing graphics processing; and a host interface unit transmitting and receiving multimedia data to and from said video unit, audio unit and graphics unit at a high speed.

2. An integrated multimedia board for high speed local bus claimed in claim 1, wherein said video unit comprises:

a video input/decoder which selects an input signal from one of three input channels from a video source and amplifies said input signal as an analog video signal which converts the analog video signal to digital video data, selecting and decoding the digital video data, converting the digital video data to a Y signal and a UV signal;

a video processor which can simultaneously process two video sources has a function of scaling, digital video mixing, and mixing graphics and video;

a frame buffer storing the processed video data;

a digital/analog converter having a function of mixing and management of a color space and two streams which have a different resolution, and a function of providing a cursor, zoom, and a graphics overlay;

a first video codec for encoding the video data;

a second video codec for decoding the video data;

a FIFO register transmitting the encoder video data through said first video codec to an audio video data controller; and a peripheral circuit.

3. An integrated multimedia board for high speed local bus claimed in claim 2, wherein said graphics unit comprises:

a graphics accelerator which performs a function of an image output and a graphics processing;

a graphics memory for storing the graphics data; and a RAMDAC for converting to an analog data when a color palette which is used for transmitting the video data to a screen is connected to said monitor.

4. An integrated multimedia board for high speed local bus claimed in claim 3, wherein said host interface unit includes a peripheral component interconnect (PCI) interface for connecting a PCI local bus for the purpose of transmitting and receiving the multimedia data at high speed.

5. An integrated multimedia board for a high speed local bus comprising:

a video unit which receives analog video data of a still image or a motion image and which includes means for compressing/decompressing said analog video data in real time and outputting the compressed/decompressed result to a monitor, wherein said video unit comprises:

a video input/decoder which selects an input signal from one of three input channels from a video source and amplifies said input signal as an analog video signal which converts the analog video signal to digital video data, selecting and decoding the digital video data, converting the digital video data to a Y signal and a UV signal;

a video processor which can simultaneously process two video sources has a function of scaling, digital video mixing, and mixing graphics and video;

a frame buffer storing the processed video data;

a digital/analog converter having a function of mixing and management of a color space and two streams which have a different resolution, and a function of providing a cursor, zoom, and a graphics overlay;

a first video codec for encoding the video data;

a second video codec for decoding the video data;

a FIFO register transmitting the encoder video data through said first video codec to an audio video data controller; and a peripheral circuit;

an audio unit which includes means for recording and reproducing audio data that represents a sound, compressing/decompressing the audio data, and synthesizing a sound source;

a graphics unit for outputting the image and performing graphics processing; and a host interface unit transmitting and receiving multimedia data to and from said video unit, audio unit and graphics unit at a high speed.

6. An integrated multimedia board for high speed local bus claimed in claim 5, wherein said host interface unit includes a peripheral component interconnect (PCI) interface for connecting a PCI local bus for the purpose of transmitting and receiving the multimedia data at high speed.

7. An integrated multimedia board for high speed local bus claimed in claim 6, wherein said graphics unit comprises:

a graphics accelerator which performs a function of an image output and a graphics processing;

a graphics memory for storing the graphics data; and a RAMDAC for converting to an analog data when a color palette which is used for transmitting the video data to a screen is connected to said monitor.

8. An integrated multimedia board for a high speed local bus comprising:

a video unit which receives analog video data of a still image or a motion image and which includes means for compressing/decompressing said analog video data in real time and outputting the compressed/decompressed result to a monitor;

an audio unit which includes means for recording and reproducing audio data that represents a sound, compressing/decompressing the audio data, and synthesizing a sound source;

a graphics unit for outputting the image and performing graphics processing, wherein said graphics unit comprises:

a graphics accelerator which performs a function of an image output and a graphics processing;

a graphics memory for storing the graphics data; and a RAMDAC for converting to an analog data when a color palette which is used for transmitting the video data to a screen is connected to said monitor; and a host interface unit transmitting and receiving multimedia data to and from said video unit, audio unit and graphics unit at a high speed.

9. An integrated multimedia board for high speed local bus claimed in claim 4, wherein said audio unit comprises:

a first audio compression/decompression processor which converts analog data to digital data and vice versa, and mixes said analog data with a compression/decompression algorithm;

a second audio compression/decompression processor which provides a compression/decompression algorithm of the audio digital data;

a processor connector which provides a serial port for communication of data of said first audio compression/decompression processor;

an audio synthesizer synthesizing the sound source;

a mixer and an amplifier for mixing and amplifying the audio output signal; and an audio video data controller for controlling and managing the audio and video data.

10. An integrated multimedia board for high speed local bus claimed in claim 9, wherein said video unit comprises:

a video input/decoder which selects an input signal from one of three input channels from a video source and amplifies said input signal as an analog video signal which converts the analog video signal to digital video data, selecting and decoding the digital video data, converting the digital video data to a Y signal and a UV signal;

a video processor which can simultaneously process two video sources has a function of scaling, digital video mixing, and mixing graphics and video;

a frame buffer storing the processed video data;

a digital/analog converter having a function of mixing and management of a color space and two streams which have a different resolution, and a function of providing a cursor, zoom, and a graphics overlay;

a first video codec for encoding the video data;

a second video codec for decoding the video data;

a FIFO register transmitting the encoder video data through said first video codec to an audio video data controller; and a peripheral circuit.

11. An integrated multimedia board for a high speed local bus comprising:

a video unit which receives analog video data of a still image or a motion image and which includes means for compressing/decompressing said analog video data in real time and outputting the compressed/decompressed result to a monitor;

an audio unit which includes means for recording and reproducing audio data that represents a sound, compressing/decompressing the audio data, and synthesizing a sound source;

a graphics unit for outputting the image and performing graphics processing; and a host interface unit transmitting and receiving multimedia data to and from said video unit, audio unit and graphics unit at a high speed, wherein said host interface unit includes a peripheral component interconnect (PCI) interface for connecting a PCI local bus for the purpose of transmitting and receiving the multimedia data at high speed.

12. An integrated multimedia board for high speed local bus claimed in claim 11, wherein said audio unit comprises:

a first audio compression/decompression processor which converts analog data to digital data and vice versa, and mixes said analog data with a compression/decompression algorithm;

a second audio compression/decompression processor which provides a compression/decompression algorithm of the audio digital data;

a processor connector which provides a serial port for communication of data of said first audio compression/decompression processor;

an audio synthesizer synthesizing the sound source;

a mixer and an amplifier for mixing and amplifying the audio output signal; and an audio video data controller for controlling and managing the audio and video data.

13. An integrated multimedia board for high speed local bus claimed in claim 12, wherein said video unit comprises:

a video input/decoder which selects an input signal from one of three input channels from a video source and amplifies said input signal as an analog video signal which converts the analog video signal to digital video data, selecting and decoding the digital video data, converting the digital video data to a Y signal and a UV signal;

a video processor which can simultaneously process two video sources has a function of scaling, digital video mixing, and mixing graphics and video;

a frame buffer storing the processed video data;

a digital/analog converter having a function of mixing and management of a color space and two streams which have a different resolution, and a function of providing a cursor, zoom, and a graphics overlay;

a first video codec for encoding the video data;

a second video codec for decoding the video data;

a FIFO register transmitting the encoder video data through said first video codec to an audio video data controller; and a peripheral circuit.

14. An integrated multimedia board for high speed local bus claimed in claim 13, wherein said graphics unit comprises:

a graphics accelerator which performs a function of an image output and a graphics processing;

a graphics memory for storing the graphics data; and a RAMDAC for converting to an analog data when a color palette which is used for transmitting the video data to a screen is connected to said monitor.

* * * * *